(12) United States Patent
Carlson et al.

(10) Patent No.: US 12,495,738 B2
(45) Date of Patent: Dec. 16, 2025

(54) COTTON PICKER SPINDLE WITH REPLACEABLE TIP

(71) Applicant: DEERE & COMPANY, Moline, IL (US)

(72) Inventors: Brandon C. Carlson, Ankeny, IA (US);
Sanjeev M. Hallale, Pune (IN);
Matthew C. Roney, Ankeny, IA (US);
Charles F. Ostermeier, Slater, IA (US);
Hema V. Guthy, Moline, IL (US);
Hector Portillo, Monterrey (MX);
Mohamad El-Zein, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 890 days.

(21) Appl. No.: 17/449,490

(22) Filed: Sep. 30, 2021

(65) Prior Publication Data

US 2022/0132739 A1 May 5, 2022

Related U.S. Application Data

(60) Provisional application No. 63/107,679, filed on Oct. 30, 2020.

(51) Int. Cl.
*A01D 46/16* (2006.01)
(52) U.S. Cl.
CPC .................................. *A01D 46/16* (2013.01)
(58) Field of Classification Search
CPC ........................................ A01D 46/00–46/30
See application file for complete search history.

(56) References Cited

U.S. PATENT DOCUMENTS

| | | | | |
|---|---|---|---|---|
| 1,184,795 A | * | 5/1916 | Volkman ............... | A01D 46/14 56/44 |
| 1,387,176 A | * | 8/1921 | Price ..................... | A01D 46/14 56/47 |

(Continued)

FOREIGN PATENT DOCUMENTS

| CN | 1826854 A | 9/2006 |
|---|---|---|
| CN | 101711492 A | 5/2010 |

(Continued)

OTHER PUBLICATIONS

Image of Zhejiang Yajia Cotton Picker Spindler Gear, May 22, 2019, 1 page.

*Primary Examiner* — Christopher J Sebesta
*Assistant Examiner* — Madeline I Runco (57) ABSTRACT

A spindle assembly includes a spindle nut having a cylindrically shaped bore and a threaded portion that engages a threaded opening in a cotton picker bar. The spindle assembly further includes a first friction reducing element disposed in the cylindrically shaped bore, a cotton picking member. The cotton picking member includes a barbed end, an engaging end, and a cylindrically shaped shaft located between the barbed end and the engaging end. A drive member includes a receiving end that receives the engaging end of the cotton-picking member and a geared end that engages a gear on a driveshaft in the cotton picker bar. The cylindrically shaped shaft includes a surface rotatably supported within the first friction reducing element.

19 Claims, 11 Drawing Sheets

(56) References Cited

U.S. PATENT DOCUMENTS

| | | | | |
|---|---|---|---|---|
| 1,530,151 | A | * | 3/1925 | Newton .................. A01D 46/14 56/44 |
| 1,755,825 | A | * | 4/1930 | Johnston ................ A01D 46/14 56/47 |
| 2,279,598 | A | * | 4/1942 | Smith .................... A01D 46/14 56/41 |
| 2,497,776 | A | * | 2/1950 | Kallgren ................ A01D 46/14 384/241 |
| 2,497,777 | A | | 2/1950 | Baker et al. |
| 2,667,725 | A | | 2/1954 | Voigt |
| 2,669,828 | A | * | 2/1954 | Hutchins, Jr. .......... A01D 46/14 56/50 |
| 2,672,720 | A | * | 3/1954 | Smith .................... A01D 46/14 56/50 |
| 2,785,523 | A | * | 3/1957 | Frudden ................ A01D 46/14 56/42 |
| 2,791,877 | A | * | 5/1957 | Fergason ............... A01D 46/14 56/50 |
| 2,844,932 | A | * | 7/1958 | Bramblett ............. A01D 46/14 56/50 |
| 2,869,308 | A | * | 1/1959 | Barbknecht ............ A01D 46/18 56/50 |
| 3,137,115 | A | | 6/1964 | Kath, Jr. et al. |
| 3,464,194 | A | * | 9/1969 | Fergason ................ A01D 46/14 56/47 |
| 3,501,903 | A | * | 3/1970 | Fergason ............... A01D 46/18 56/44 |
| 7,650,735 | B2 | * | 1/2010 | Fox ........................ A01D 46/16 56/36 |
| 7,861,504 | B2 | * | 1/2011 | Fox ........................ A01D 46/16 56/33 |
| 8,087,222 | B2 | * | 1/2012 | Goering ................. A01D 46/16 56/36 |
| 2009/0313963 | A1 | | 12/2009 | Fox et al. |
| 2010/0037579 | A1 | * | 2/2010 | Goering ................. A01D 46/16 56/50 |

FOREIGN PATENT DOCUMENTS

| | | | |
|---|---|---|---|
| CN | 103703932 | A | 4/2014 |
| CN | 203723091 | U | 7/2014 |
| CN | 204907187 | U | 12/2015 |
| CN | 108781743 | A | 11/2018 |
| CN | 108781744 | A | 11/2018 |
| CN | 208191366 | U * | 12/2018 |
| CN | 209949887 | U | 1/2020 |
| WO | WO-2017049807 | A1 * | 3/2017 |

* cited by examiner

COTTON PICKER SPINDLE WITH REPLACEABLE TIP

CROSS-REFERENCE TO RELATED APPLICATIONS

This application claims the benefit of U.S. Provisional Application No. 63/107,679, filed Oct. 30, 2020. The entire disclosure of the application referenced above is incorporated by reference.

FIELD

The present disclosure relates generally to cotton harvesters and, more specifically, to spindles for cotton pickers.

BACKGROUND

A typical cotton picker includes a plurality of rotating barbed spindles which project into the plants. A picker drum assembly includes a plurality of vertical picker bars which each support a column of rotatable picker spindles. Each picker spindle is elongated and is driven to rotate the spindle about its principle axis as the barbs engage the cotton. The cotton wraps around the spindles and is doffed therefrom by a doffing mechanism which includes a plurality of flexible doffers, one for each row of picking spindles. Cotton pickers typically include from two to six forwardly located row units, each unit supporting a pair of upright picker drums having from twelve to sixteen picker bars. Each picker bar, in turn, rotatably supports up to twenty picker spindles.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A spindle assembly includes a spindle nut having (i) a cylindrically shaped bore and (ii) a threaded portion adapted to engage a threaded opening in a cotton picker bar. The spindle assembly also includes a first friction reducing element that is adapted for receipt within the cylindrically shaped bore and a cotton picking member having (i) a barbed end, (ii) an engaging end, and (iii) a cylindrically shaped shaft located between the barbed end and the engaging end. The cylindrically shaped shaft includes a surface rotatably supported within the first friction reducing element. The spindle assembly further includes a drive member having (i) a receiving end configured to receive the engaging end of the cotton-picking member and (ii) a geared end configured to engage a gear on a driveshaft in the cotton picker bar.

In other features, the engaging end of the cotton picking member is not configured to engage or mate with the gear on the driveshaft in the cotton picker bar.

In other features, the receiving end of the drive member receives the engaging end of the cotton picking member within the cylindrically shaped bore of the spindle nut.

In other features, the cotton-picking member includes a shoulder radially disposed about an external circumference of the cylindrically shaped shaft, and the first friction reducing element is further adapted to (i) engage the shoulder and (ii) retain the cotton picking member when the spindle nut is threaded into the threaded opening in the cotton picker bar.

In other features, the engaging end of the cotton picking member includes a first plurality of radially-disposed splines. The receiving end of the drive member includes an integrally formed opening with a second plurality of inwardly facing splines and the integrally formed opening of the receiving end of the drive member receives the first plurality of splines of the engaging end of the cotton picking member.

In other features, the first plurality of radially-disposed splines are not configured to engage the gear on the driveshaft in the cotton picker bar.

In other features, the engaging end of the cotton picking member includes a first plurality of radially-disposed tapered splines, each spline of the first plurality of tapered splines having a first end, a second end, and a length therebetween, and being tapered inwardly from the first end to the second end at a taper angle toward a centerline of the cotton picking member.

In other features, the first plurality of radially-disposed tapered splines are not configured to engage the gear on the driveshaft in the cotton picker bar.

In other features, the receiving end of the drive member includes a integrally formed opening with a second plurality of inwardly tapered splines, each spline of the second plurality of tapered splines having a first end, a second end, and a length therebetween, and being tapered inwardly from the first end to the second end at a second taper angle toward a centerline of the drive member.

In other features, the first taper angle is equal to the second taper angle.

In other features, the first taper angle is different than the second taper angle.

In other features, the cotton engaging member has a first brittleness, the drive member has a second brittleness, and the first brittleness is greater than the second brittleness.

In other features, the first friction reducing element is one of a bushing or bearing.

In other features, the spindle assembly includes a second friction reducing element adapted (i) for receipt within an opening of the cotton picker bar and (ii) to retain the drive member in the picker bar. The second friction reducing element is one of a bushing or bearing.

A cotton spindle includes a barbed portion, a drive portion, and a cylindrically shaped shaft located between the barbed portion and the drive portion and configured to be rotatably supported within a friction reducing element disposed in a spindle nut. The cotton spindle also includes a shoulder radially (i) disposed about an external circumference of the cylindrically shaped shaft and (ii) configured to engage the friction reducing element.

In other features, the drive portion is not configured to engage or mate with a gear located in a picker bar.

In other features, the drive portion includes a plurality of radially-disposed tapered splines, each spline of the plurality of tapered splines having a first end, a second end, and a length therebetween, and being tapered inwardly from the first end to the second end at a taper angle toward a centerline of the cotton spindle.

In other features, the plurality of radially-disposed tapered splines are not configured to engage a bevel gear located in a picker bar.

In other features, the drive portion includes a plurality of radially-disposed splines, each spline of the plurality of tapered splines having a first end, a second end, a length therebetween, and an outwardly facing surface that is substantially parallel with a centerline of the cotton spindle.

In other features, the cotton spindle includes a radial undercut disposed between the shoulder and the drive portion.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
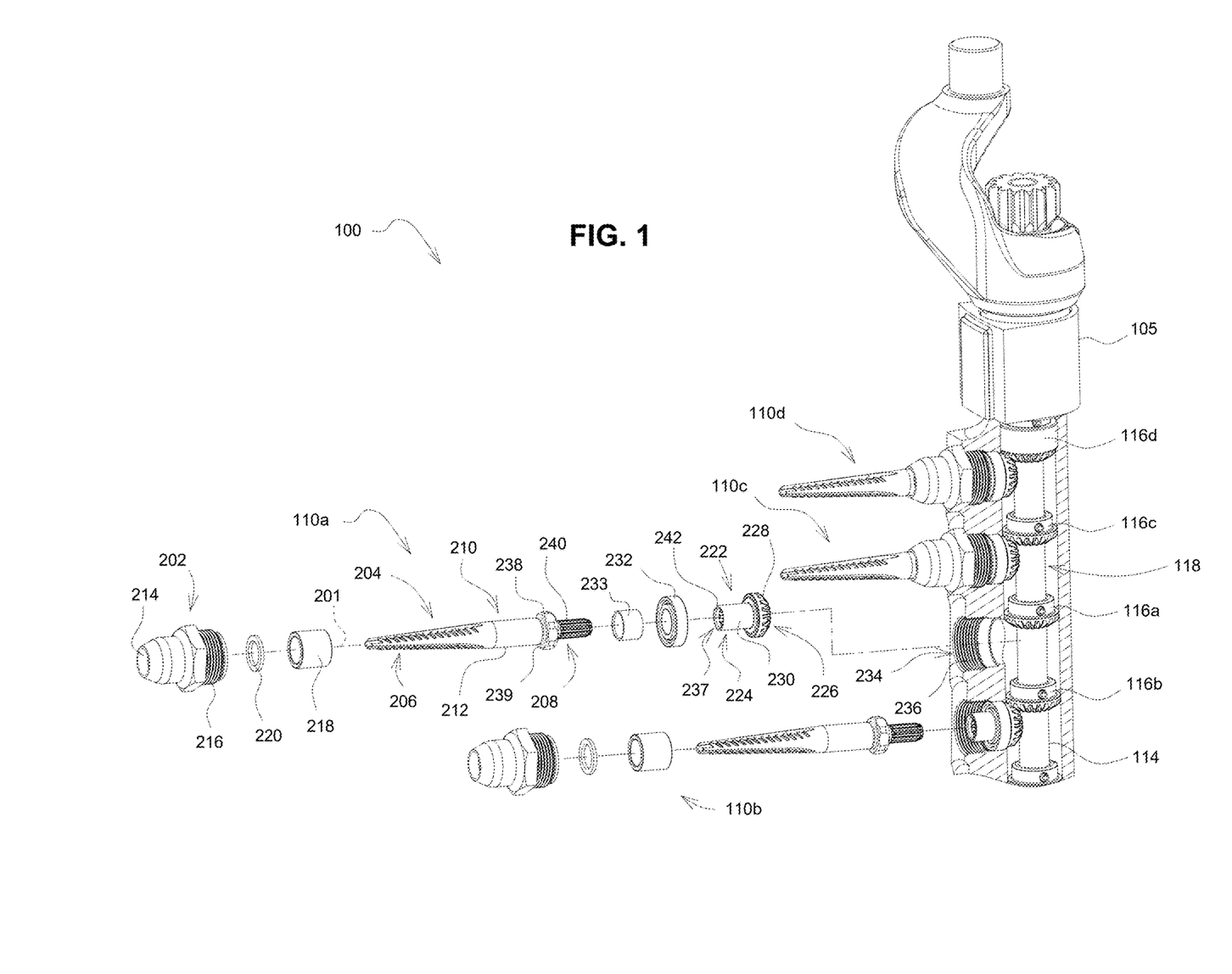
FIG. 1 is a partially exploded view of a portion of an example cotton picker bar assembly according to the principles of the present disclosure.

Referring to FIG. 1, there is shown a portion of a cotton picker bar assembly 100 including a picker bar 105 and a plurality of spindle assemblies 110a-d. The cotton picker bar assembly 100 also includes a drive shaft 114 located within the picker bar 105. A plurality of beveled bar gears 116a-d are connected to the driveshaft 114, such that the drive shaft 114 and the beveled bar gears 116a-d rotate within the picker bar 105 as a single drive unit 118.

Figure 2:
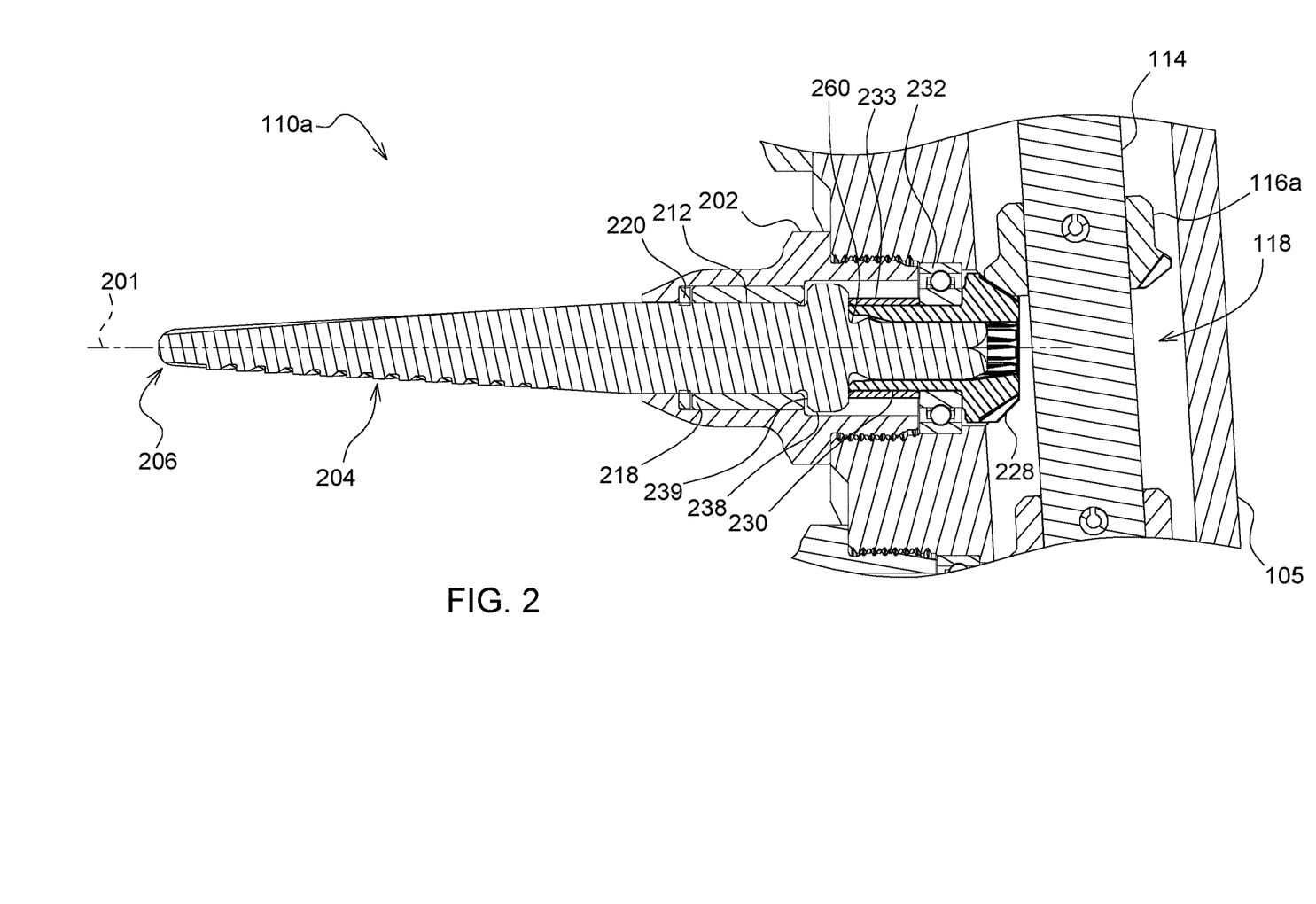
FIG. 2 is a cross-sectional view of a portion of the example cotton picker spindle assembly of FIG. 1.

FIG. 2 is a cross-sectional view of the spindle assembly 110a. With reference to FIGS. 1 and 2, the spindle assembly 110a includes a spindle nut 202 and a picking member 204. The picking member 204 includes a barbed end 206 and an engaging end 208. A cylindrical shaft 210 is located between the barbed end 206 and the engaging end 208. The cylindrical shaft 210 of the picking member 204 includes a first smooth surface 212.

The spindle nut 202 has a cylindrically shaped bore 214 and a threaded portion 216. The cylindrically shaped bore 214 receives a first friction reducing element 218 and a seal 220. In some implementations, the first friction reducing element 218 is a bushing. In other implementations, the first friction reducing element 218 is a bearing—for example, a needle bearing or a ball bearing. The first friction reducing element 218 may be press-fitted into the cylindrically shaped bore 214. The first smooth surface 212 of the cylindrically shaft 210 is rotatably supported within the first friction reducing element 218.

A drive member 222 has a receiving end 224 and a geared end 226. The geared end 226 includes a beveled drive gear 228 that mates with the beveled bar gear 116a. A second smooth surface 230 of the drive member 222 is rotatably supported by a second friction reducing element 232. A sleeve 233 radially surrounds a portion of the receiving end 224 of the drive member 222. The sleeve 232 includes a cylindrical bore that may contact the second smooth surface 230 of the drive member 222. The second friction reducing element 232 retains and centers the drive member 222 in a cylindrical opening 234 in the picker bar 105. In some implementations, the second friction reducing element 232 is a bearing—for example, a ball bearing or a needle bearing. In other implementations, the second friction reducing element 232 is a bushing. The second reducing element 232 may be press-fitted into the cylindrical opening 234 of the picker bar 105.

Although the drive member 222 and the second friction reducing element 232 are shown in the figures as two separate and distinct elements, in some implementations, the drive member 222 and the second friction reducing element 232 may be a single combined element. For example, a main body of the drive member 222 may include an integrally formed inner race (not shown) and the drive member 222 includes an outer race (not shown) that encircles the integrally formed inner race and is supported by a plurality of ball bearings disposed between the inner race and the outer race. In such implementations, the outer race may be press-fitted into the cylindrical opening 234 of the picker bar 105 to retain and center the drive member 222.

The threaded portion 216 of the spindle nut 202 engages a threaded portion 236 of the cylindrical opening 234 to mount the spindle assembly 110a to the picker bar 105. The receiving end 224 of the drive member 222 includes an integrally formed opening 237 that receives the engaging end 208 of the picking member 204.

Figures 3A, 3B:
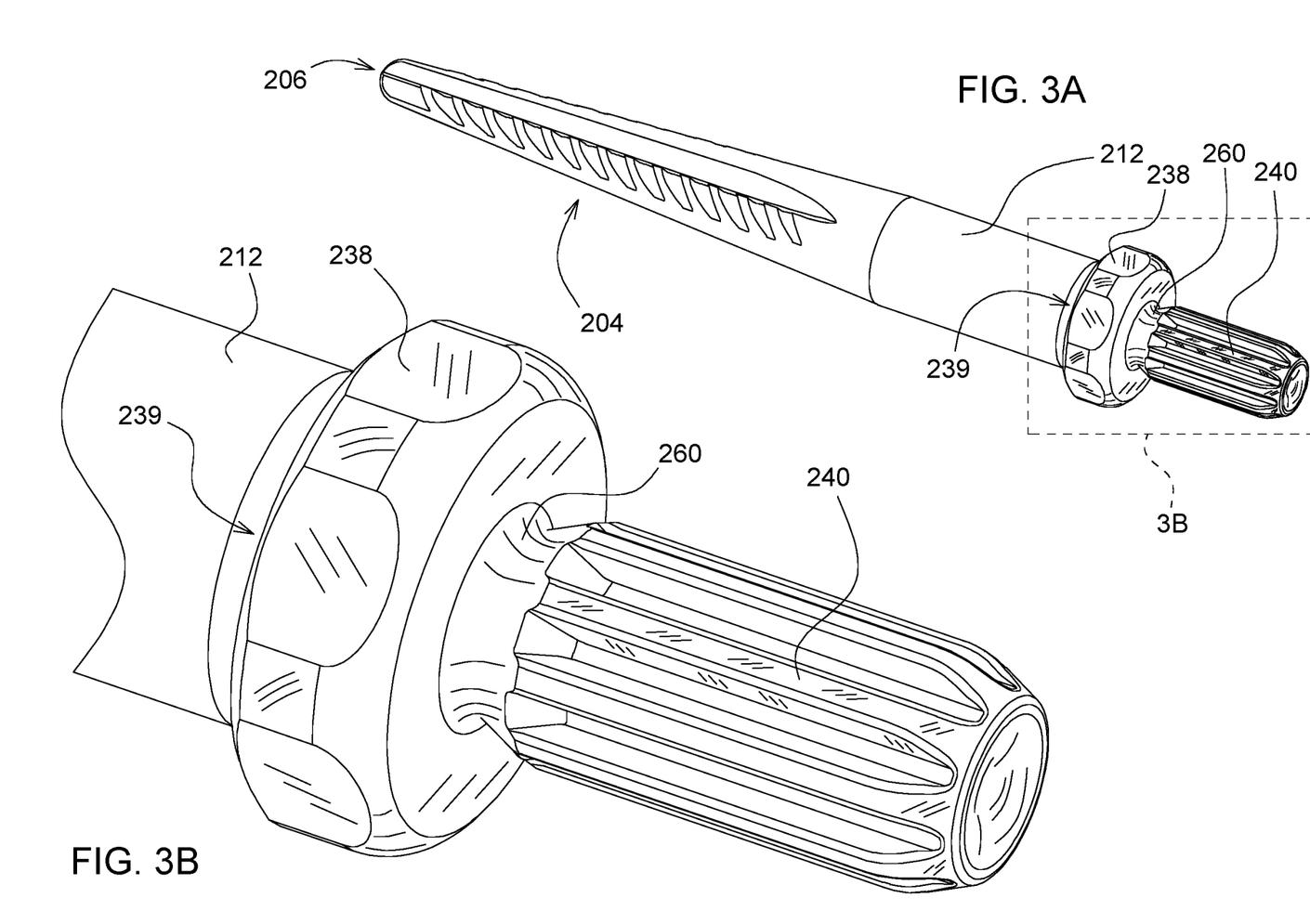
FIG. 3A is an isometric view of an example cotton picker spindle tip according to the principles of the present disclosure.
FIG. 3B is a detail view of a portion of the cotton picker spindle tip shown in FIG. 3A.
Figure 4:
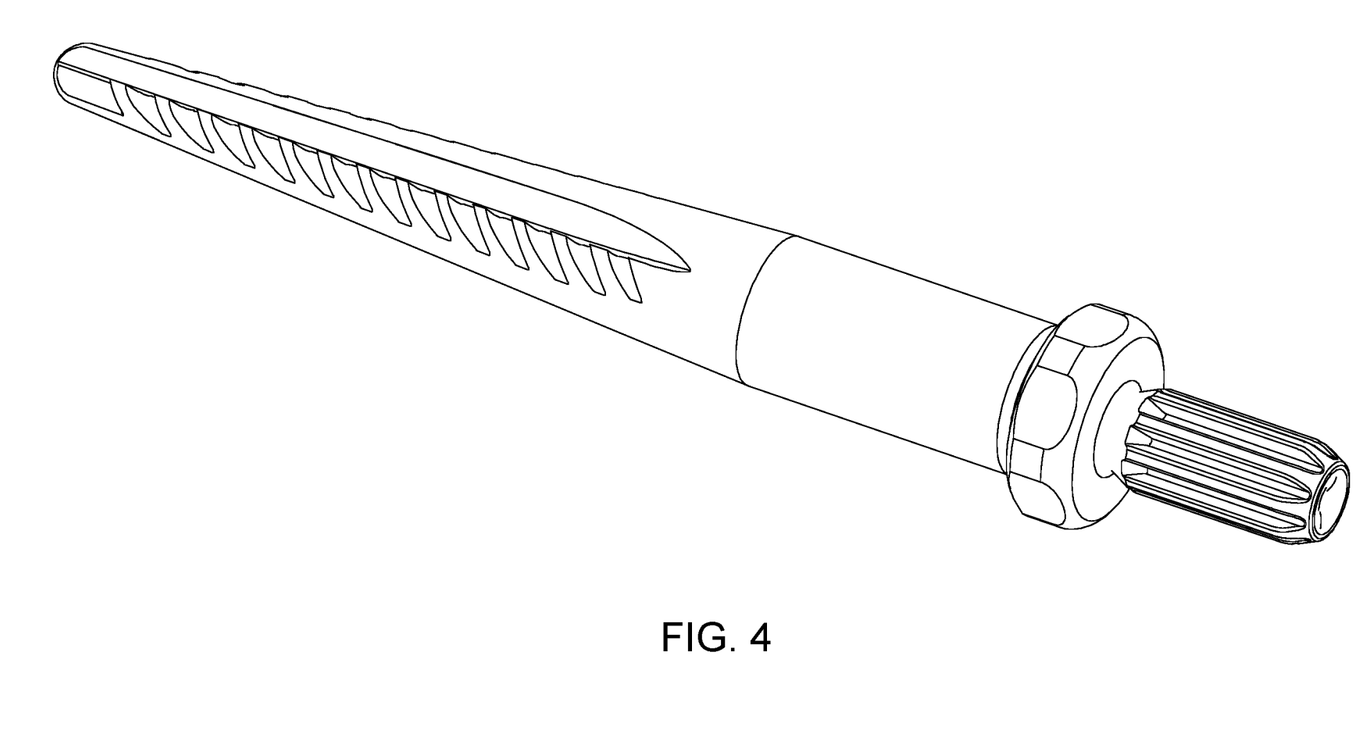
FIG. 4 is a perspective view of an example implementation of a cotton picker spindle tip according to the principles of the present disclosure.
Figure 5:
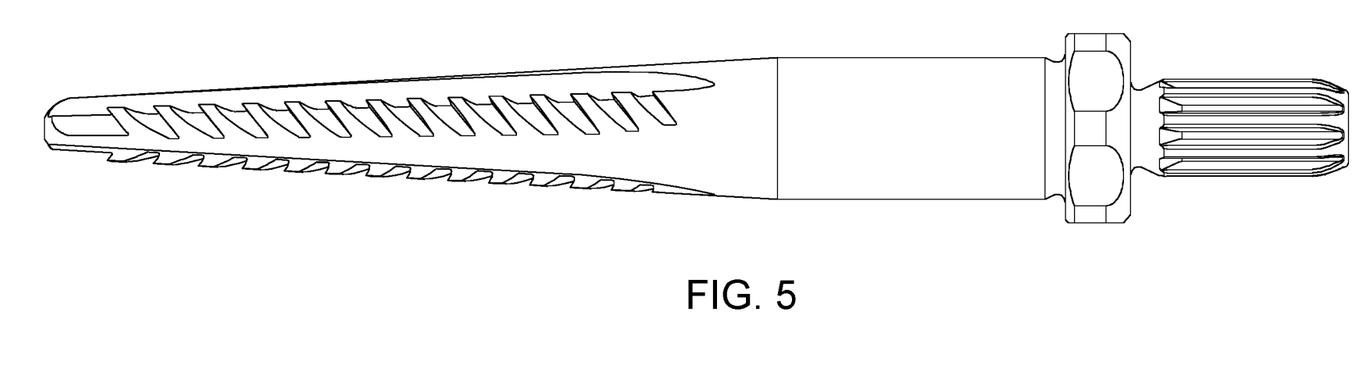
FIG. 5 is a first side elevational view of the cotton picker spindle tip depicted in FIG. 4.
Figure 6:
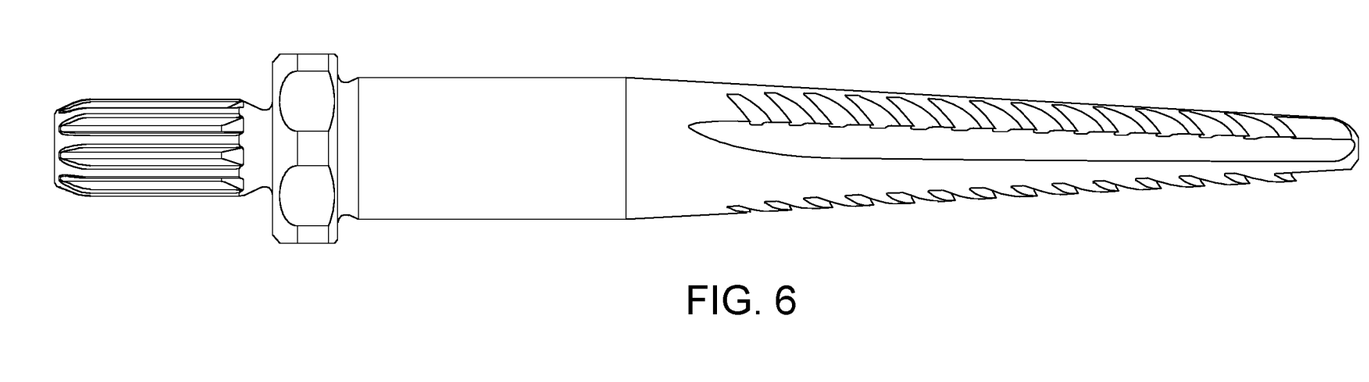
FIG. 6 is a second side elevational view of the cotton picker spindle tip depicted in FIG. 4.
Figure 7:
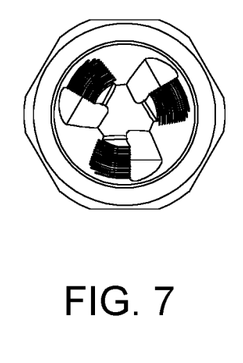
FIG. 7 is a first end elevational view of the cotton picker spindle tip depicted in FIG. 4.
Figure 8:
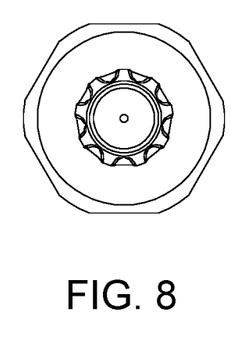
FIG. 8 is a second end elevational view of the cotton picker spindle tip depicted in FIG. 4.
Figure 9:
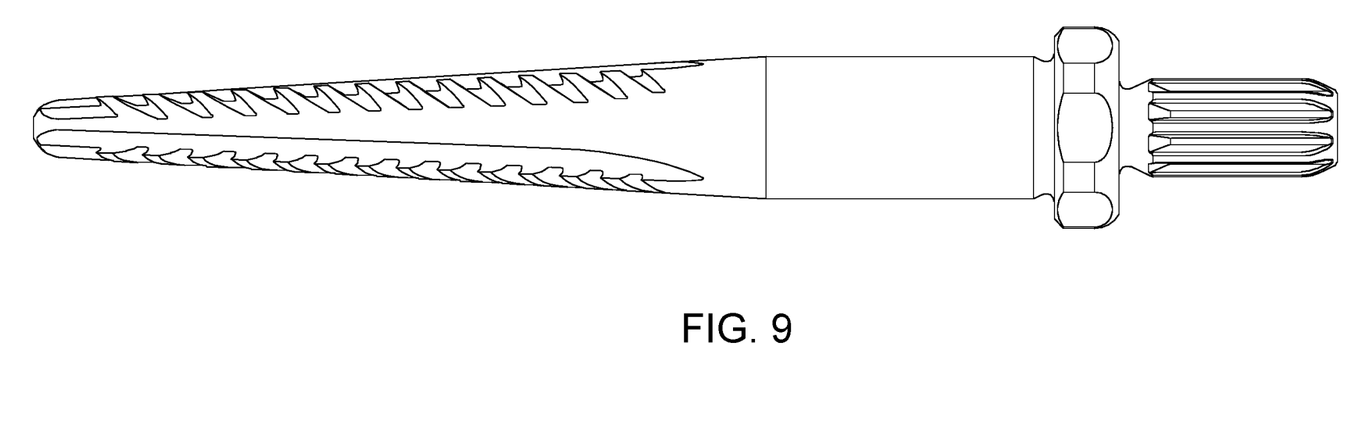
FIG. 9 is a first plan view of the cotton picker spindle tip depicted in FIG. 4.
Figure 10:
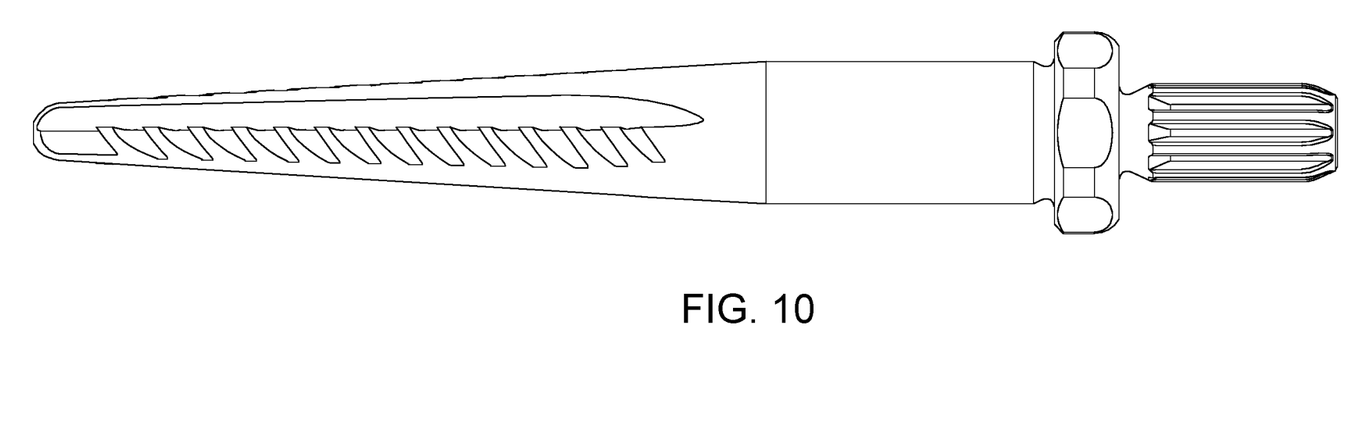
FIG. 10 is a second plan view of the cotton picker spindle tip depicted in FIG. 4.
Figure 11:
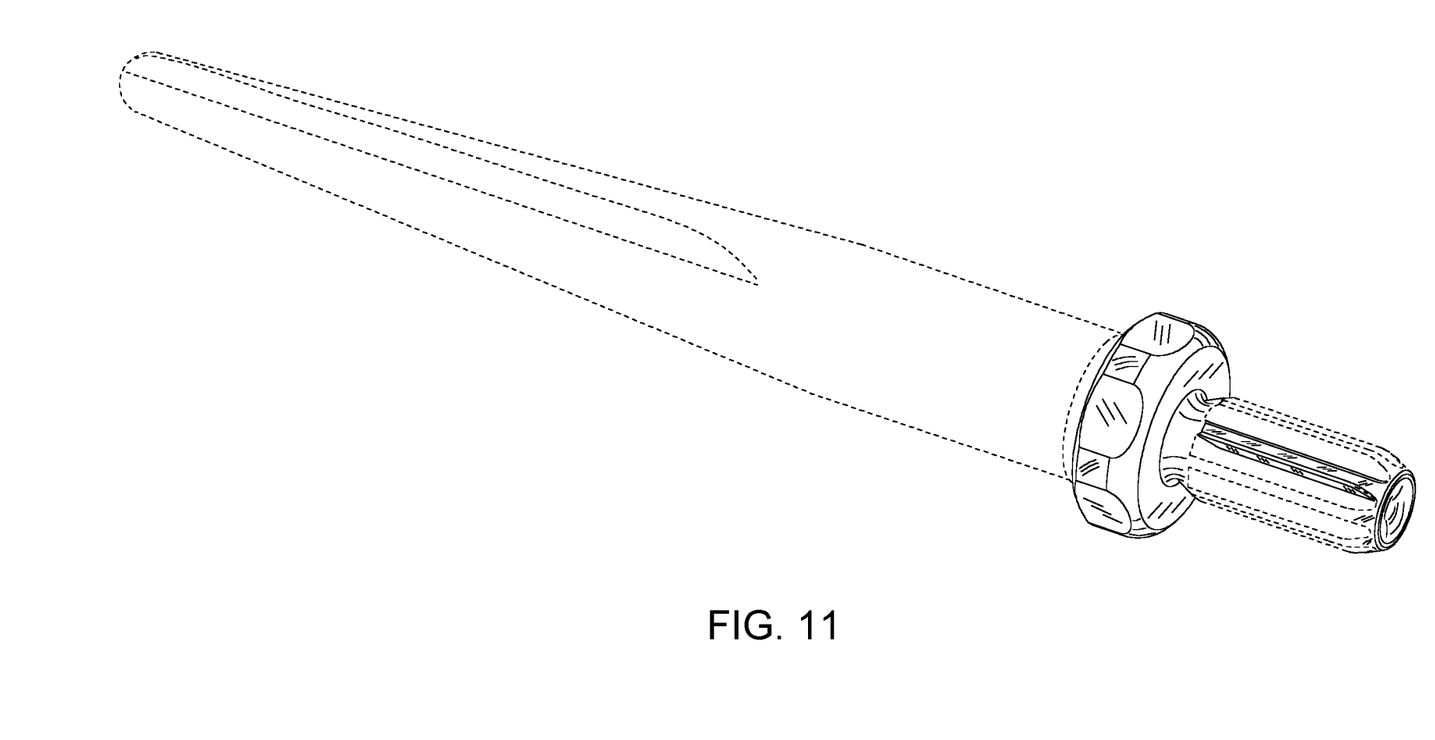
FIG. 11 is a perspective view of another example implementation of a cotton picker spindle tip according to the principles of the present disclosure.
Figure 12:
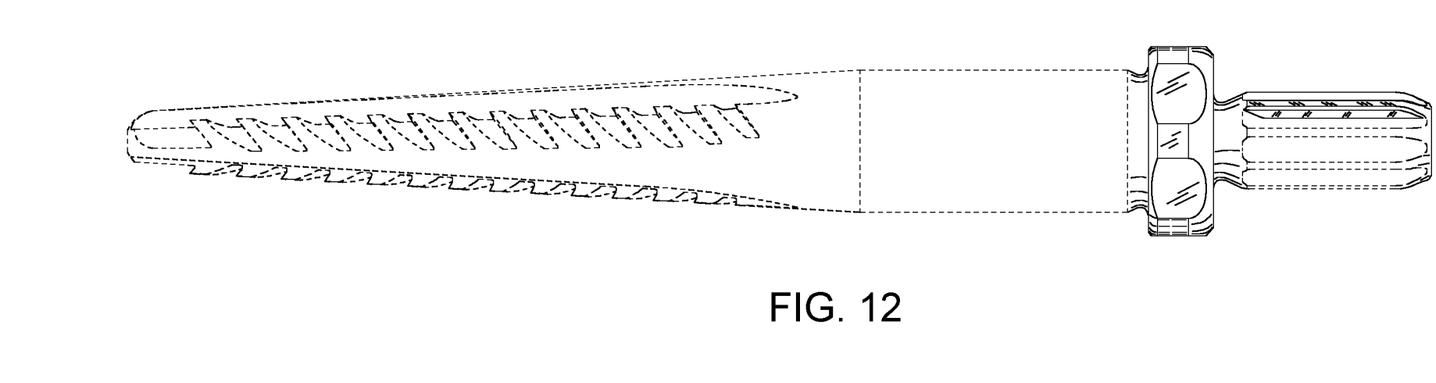
FIG. 12 is a first side elevational view of the cotton picker spindle tip depicted in FIG. 11.
Figure 13:
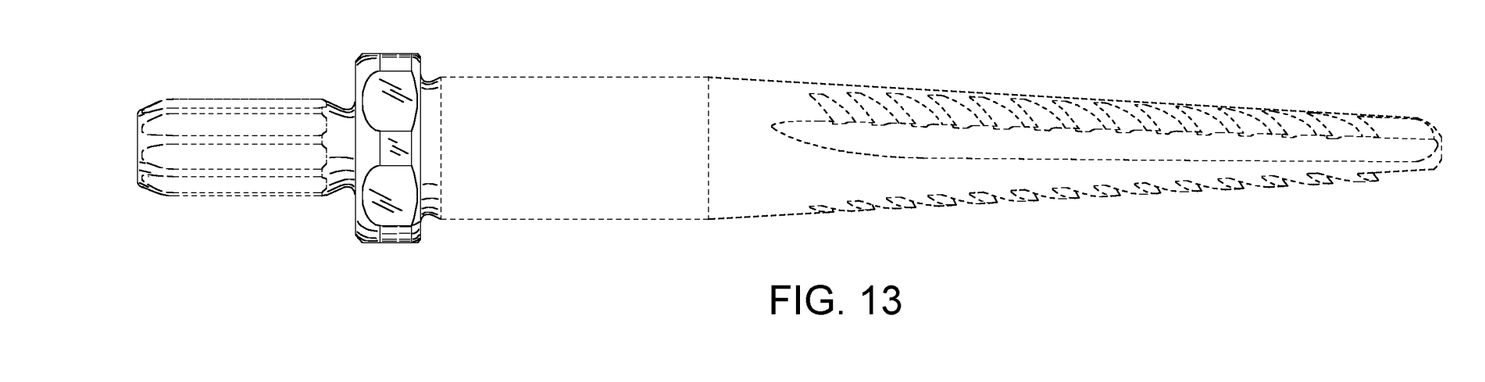
FIG. 13 is a second side elevational view of the cotton picker spindle tip depicted in FIG. 11.
Figure 14:
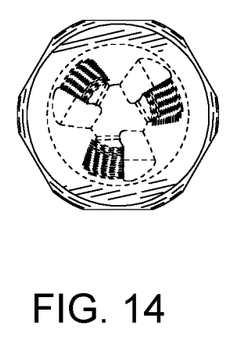
FIG. 14 is a first end elevational view of the cotton picker spindle tip depicted in FIG. 11.
Figure 15:
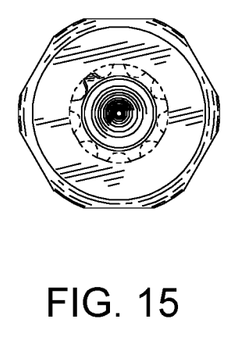
FIG. 15 is a second end elevational view of the cotton picker spindle tip depicted in FIG. 11.
Figure 16:
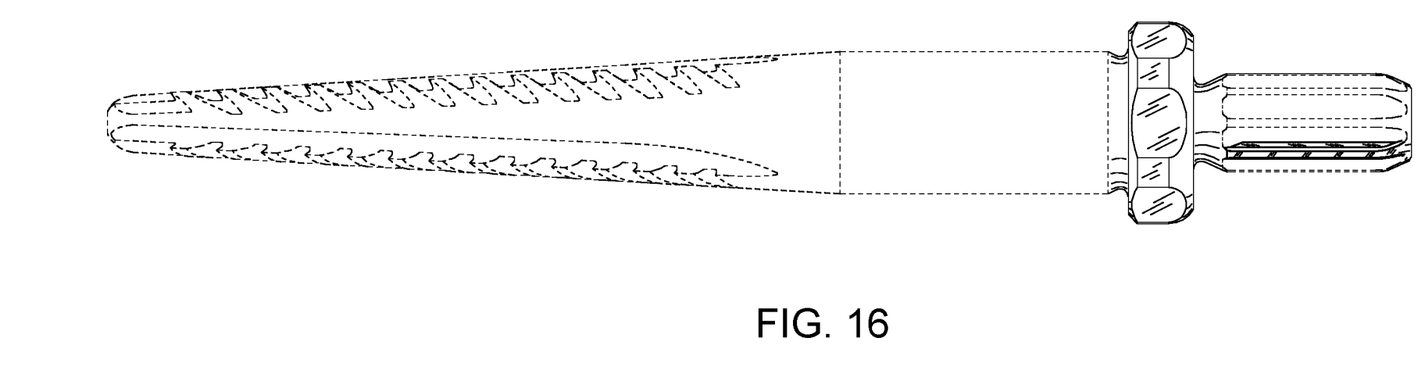
FIG. 16 is a first plan view of the cotton picker spindle tip depicted in FIG. 11.
Figure 17:
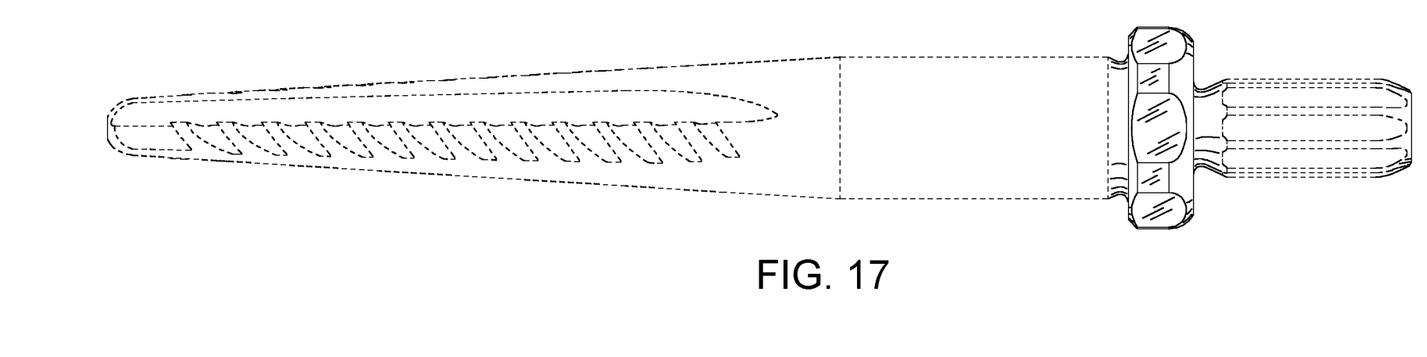
FIG. 17 is a second plan view of the cotton picker spindle tip depicted in FIG. 11.

FIG. 3A is an isometric view of the picking member 204 and FIG. 3B is a detail view of the engaging end 208 of the picking member 204. The picking member 204 includes a shoulder 238 that is radially disposed about an external circumference of the picking member 204. The shoulder 238 is located between the first smooth surface 212 of the cylindrically shaft 210 and the engaging end 208 of the picking member 204. The shoulder 238 includes a face 239 that is perpendicular to a centerline 201 of the picking member 204 and directed toward the barb end 206 of the picking member 204.

When the spindle assembly 110a is mounted to the picker bar 105, the engaging end 208 of the picking member 204 is received in the integrally formed opening 237 of the receiving end 224 within the cylindrically shaped bore 214 of the spindle nut 202 and rotation of the drive member 222 results in rotation of the picking member 204. Further, the first friction reducing element 218 retains the picking member 204. For example, the first friction reducing element 218 may contact the face 239 of the shoulder 238, restricting movement of the picking member 204 along the direction of the centerline 201.

As shown in the figures, the engaging end 208 of the picking member 204 does not directly engage, mate, or contact the beveled bar gear 116a. In some implementations, a plurality of splines 240 are radially-disposed the about the circumference of the engaging end 208 of the picking member 204 and the integrally formed opening 237 of the receiving end 224 of the drive member 222 includes a plurality of inward facing splines 242. The plurality of splines 240 and the plurality of inward facing splines 242 may each include the same number of splines. Although the plurality of splines 240 and the plurality of inward facing splines 242 are depicted as each including nines splines, the plurality of splines 240 and the plurality of inward facing splines 242 may each include fewer splines—for example, two to eight splines. Alternatively, the plurality of splines 240 and the plurality of inward facing splines 242 may each include more than nine splines—for example 10, 11, or 12 splines.

In various implementations, the plurality of splines 240 includes a fewer number of splines than the plurality of inward facing splines 242. In such implementations, the plurality of splines 240 are radially spaced on the periphery of the engaging end 208 of the picking member 204 such that the plurality of inward facing splines 242 receives the plurality of splines 240.

Each spline of the plurality of splines 240 and the plurality of inward facing splines 242 has a first end, a second end, and a length therebetween. In some implementations, each spline of the plurality of splines 240 is tapered inwardly from the first end to the second end at a taper angle toward the centerline 201 of the cotton picking member 204. In other implementations, an outwardly facing surface of each spline of the plurality of splines 240 is parallel to the centerline 201 of the cotton picking member 204.

In various implementations, the picking member 204 includes a radial disposed undercut 260—e.g., a relief—located between the shoulder 238 and the plurality of splines 240. Under a torque overload condition, the undercut 260 causes the barb end 206 of the picking member 204 to shear from the engaging end 208 of picking member 204. As such, the undercut 260 provides protection to downstream parts—for example but not limited to, the drive member 222, the bevel gears 116a-d, or the drive shaft 114—during a torque overload event. The undercut 260 may also aid in the repair and/or replacement of a broken—e.g., sheared—picking member 204. The size and/or shape of the undercut 260 may be selected so that the picking member 204 shears at or near a specific torque limit.

In other implementations, the engaging end 208 of the picking member 204 may have a pentagonal, hexagonal, or other multi-sided shape and the integrally formed opening 237 has a shape that corresponds to the shape of the engaging end 208 such that rotation of the drive member 222 results in rotation of the picking member 204. In yet other implementations, the engaging end 208 includes a key and the integrally formed opening 237 includes a least one recess that accepts the key of the engaging end 208 such that rotation of the drive member 222 results in rotation of the picking member 204.

In various implementations, the picking member 204 is more brittle than the drive member 208, such that when the picking member 204 comes into contact with an object that is harder than any portion of a cotton plant—for example, a rock, pieces of metal, or a fence post—the picking member 204 breaks or shears before the drive member 208 either deforms, breaks, or shears. The picking member 204 may be constructed of a first material that has a first brittleness measurement and the drive member 208 may be constructed of a second material that has a second brittleness measurement that is less than the first brittleness measurement. Alternatively, the picking member 204 and the drive member 208 may be constructed of the same material and the picking member 204 and the drive member 208 are subjected to different treatments—for example, heat treatments—such that the picking member 204 is more brittle than the drive member 208.

FIGS. 4-10 illustrate an example implementation of a cotton picker spindle tip according to the principles of the present disclose—for example, the picking member 204. FIGS. 11-17 illustrate yet another example implementation of a cotton picker spindle tip according to the principles of the present disclose for example, the picking member 204.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

What is claimed is:
1. A spindle assembly comprising:
a spindle nut having (i) a cylindrically shaped bore and (ii) a threaded portion adapted to engage a threaded opening in a cotton picker bar;
a first friction reducing element adapted for receipt within the cylindrically shaped bore;
a cotton picking member having (i) a barbed end, (ii) an engaging end, (iii) a cylindrically shaped shaft located between the barbed end and the engaging end, wherein the cylindrically shaped shaft includes a surface rotatably supported within the first friction reducing ele- ment, and (iv) a shoulder radially disposed about an external circumference of the cylindrically shaped shaft; and a drive member having (i) a receiving end configured to receive the engaging end of the cotton-picking member and (ii) a geared end configured to engage a gear on a driveshaft in the cotton picker bar, wherein the first friction reducing element is further adapted to (i) engage the shoulder of the cotton picking member and (ii) retain the cotton picking member when the spindle nut is threaded into the threaded opening in the cotton picker bar, wherein the cotton picking member and the drive member are configured to rotate about the same axis of rotation when the engaging end of the cotton-picking member is received in the receiving end of the drive member, and wherein the receiving end of the drive member receives the engaging end of the cotton picking member within the cylindrically shaped bore of the spindle nut.

2. The spindle assembly of claim 1, wherein the engaging end of the cotton picking member is not configured to engage or mate with the gear on the driveshaft in the cotton picker bar.

3. The spindle assembly of claim 1, wherein:
the engaging end of the cotton picking member includes a first plurality of radially-disposed splines,
the receiving end of the drive member includes an integrally formed opening with a second plurality of inwardly facing splines, and
the integrally formed opening of the receiving end of the drive member receives the first plurality of splines of the engaging end of the cotton picking member.

4. The spindle assembly of claim 3, wherein the first plurality of radially-disposed splines are not configured to engage the gear on the driveshaft in the cotton picker bar.

5. The spindle assembly of claim 1, wherein the engaging end of the cotton picking member includes a first plurality of radially-disposed tapered splines, each spline of the first plurality of tapered splines having a first end, a second end, and a length therebetween, and being tapered inwardly from the first end to the second end at a taper angle toward a centerline of the cotton picking member.

6. The spindle assembly of claim 5, wherein the first plurality of radially-disposed tapered splines are not configured to engage the gear on the driveshaft in the cotton picker bar.

7. The spindle assembly of claim 5, wherein the receiving end of the drive member includes an integrally formed opening with a second plurality of inwardly tapered splines, each spline of the second plurality of tapered splines having a first end, a second end, and a length therebetween, and being tapered inwardly from the first end to the second end at a second taper angle toward a centerline of the drive member.

8. The spindle assembly of claim 7, wherein the first taper angle is equal to the second taper angle.

9. The spindle assembly of claim 7, wherein the first taper angle is different than the second taper angle.

10. The spindle assembly of claim 1, wherein the cotton engaging member has a first brittleness, the drive member has a second brittleness, and the first brittleness is greater than the second brittleness.

11. The spindle assembly of claim 1, wherein the first friction reducing element is one of a bushing or bearing.

12. The spindle assembly of claim 1, further comprising a second friction reducing element adapted (i) for receipt within a non-threaded opening in the cotton picker bar and (ii) to retain the drive member in the picker bar,
wherein the second friction reducing element is one of a bushing or bearing.

13. The spindle assembly of claim 1, wherein the receiving end of the drive member receives the engaging end of the cotton picking member partially within the cylindrically shaped bore of the spindle nut.

14. A cotton spindle for use with a drive member and a spindle nut, the cotton spindle comprising:
a barbed portion;
a drive portion configured to be received by the drive member within a cylindrically shaped bore of the spindle nut;
a cylindrically shaped shaft located between the barbed portion and the drive portion and configured to be rotatably supported within a friction reducing element disposed in the spindle nut; and
a shoulder radially (i) disposed about an external circumference of the cylindrically shaped shaft and (ii) configured to engage the friction reducing element,
wherein the cotton spindle and the drive member rotate about a centerline of the cotton spindle when the drive portion is received in drive member.

15. The cotton spindle of claim 14, wherein the drive portion is not configured to engage or mate with a gear located in a picker bar.

16. The cotton spindle of claim 14, wherein the drive portion includes a plurality of radially-disposed tapered splines, each spline of the plurality of tapered splines having a first end, a second end, and a length therebetween, and being tapered inwardly from the first end to the second end at a taper angle toward the centerline of the cotton spindle.

17. The cotton spindle of claim 16, wherein the plurality of radially-disposed tapered splines are not configured to engage a bevel gear located in a picker bar.

18. The cotton spindle of claim 14, wherein the drive portion includes a plurality of radially-disposed splines, each spline of the plurality of splines having a first end, a second end, a length therebetween, and an outwardly facing surface that is substantially parallel with the centerline of the cotton spindle.

19. The cotton spindle of claim 14, further comprising a radial undercut disposed between the shoulder and the drive portion.

\* \* \* \* \*